United States Patent
Guerret et al.

(10) Patent No.: US 8,039,571 B2
(45) Date of Patent: Oct. 18, 2011

(54) USE OF A COMB POLYMER WITH AT LEAST ONE POLYALKYLENE OXIDE GRAFTED FUNCTION AS A MINERAL CHARGE COMPATIBILITY AGENT FOR CHLORINATED THERMOPLASTIC MATERIALS

(75) Inventors: Olivier Guerret, La Tour de Salvagny (FR); Patrick Trouve, Clamart (FR); Jacques Mongoin, Quincieux (FR)

(73) Assignee: Coatex S.A.S., Genay (FR)

( * ) Notice: Subject to any disclaimer, the term of this patent is extended or adjusted under 35 U.S.C. 154(b) by 343 days.

(21) Appl. No.: 12/447,663

(22) PCT Filed: Oct. 17, 2007

(86) PCT No.: PCT/IB2007/003148
§ 371 (c)(1), (2), (4) Date: May 22, 2009

(87) PCT Pub. No.: WO2008/053296
PCT Pub. Date: May 8, 2008

(65) Prior Publication Data
US 2010/0069552 A1 Mar. 18, 2010

(30) Foreign Application Priority Data
Oct. 31, 2006 (FR) ...................................... 06 09535

(51) Int. Cl.
*C08G 77/42* (2006.01)
*C08G 77/46* (2006.01)

(52) U.S. Cl. .......................................... 528/25; 528/425
(58) Field of Classification Search .................. 528/425, 528/25
See application file for complete search history.

(56) References Cited

U.S. PATENT DOCUMENTS

| 5,639,545 | A | 6/1997 | Ball |
| 2003/0082091 | A1 | 5/2003 | Jasra et al. |
| 2006/0106186 | A1* | 5/2006 | Dupont et al. ................... 528/25 |

FOREIGN PATENT DOCUMENTS

| EP | 0 639 592 A1 * | 5/1995 |
| WO | 92 02587 | 2/1992 |
| WO | 93 02021 | 2/1993 |
| WO | 2004 044022 | 5/2004 |

* cited by examiner

*Primary Examiner* — Robert D. Harlan
(74) *Attorney, Agent, or Firm* — Oblon, Spivak, McClelland, Maier & Neustadt, L.L.P.

(57) ABSTRACT

The invention firstly concerns the use as a compatibilizing agent, in a process to manufacture a chlorinated thermoplastic resin filled with a mineral material, of a comb polymer having at least one anionic monomer with ethylenic unsaturation, to which is grafted at least one polyalkylene oxide group.
The invention also concerns the chlorinated thermoplastic materials thus obtained, which have an improved compatibility between the filler and the chlorinated thermoplastic resin, whilst reducing the quantity of compatibilizing agents as used in the chlorinated and filled thermoplastic materials according to the prior art, where the said compatibilizing agents used in the prior art were essentially fatty acids, and more specifically stearic acid or its salts.

20 Claims, No Drawings

USE OF A COMB POLYMER WITH AT LEAST ONE POLYALKYLENE OXIDE GRAFTED FUNCTION AS A MINERAL CHARGE COMPATIBILITY AGENT FOR CHLORINATED THERMOPLASTIC MATERIALS

The present invention relates to the sector of chlorinated thermoplastic materials filled with a mineral filler, the compatibility of which between the said filler and the chlorinated thermoplastic resin is improved.

The invention firstly concerns the use as a compatibilising agent, in a process to manufacture a chlorinated thermoplastic resin filled with a mineral material, of a comb polymer having at least one anionic monomer with ethylenic unsaturation, to which is grafted at least one polyalkylene oxide group.

The invention also concerns the chlorinated thermoplastic materials thus obtained, which have an improved compatibility between the filler and the chlorinated thermoplastic resin, whilst reducing the quantity of compatibilising agents as used in the chlorinated and filled thermoplastic materials according to the prior art, where the said compatibilising agents used in the prior art were essentially fatty acids, and more specifically stearic acid or its salts.

Chlorinated thermoplastic materials, and notably those which are PVC-based, have many applications, such as the manufacture of tubes (water conveyance, drainage, irrigation, sheaths for the passage of cables), of external and/or internal construction materials (window profiles, shutters, doors, cladding, false ceilings) or industrial parts. They contain a mineral filler such as talc, alumina, titanium dioxide, magnesium oxide, barium sulphate, aluminium, silicon dioxide, kaolin, or again natural or synthetic calcium carbonate, fillers which are indicated in the document JP 50-028105 describing rigid materials obtained from a blend of one or more of these fillers with PVC.

With regard to chlorinated thermoplastic materials and notably PVC, calcium carbonate constitutes a preferred mineral filler, since it enables certain of the physical properties of these PVC materials thus filled to be improved, as described in the document "The use of calcium carbonate to enhance the physical properties of rigid vinyl products" (Society of Plastic Engineering, Conf., 12-14 Oct. 1999): improvement of rigidity, reduction of cooling time during extrusion, or again reduction of the deposit on output from the die (commonly designated by the English expression "die build-up").

According to the basic knowledge of the skilled man in the art, who is a manufacturer of plastics, and notably PVC-based and filled chlorinated thermoplastic materials, the resin comprising the said materials is a hydrophobic medium in which calcium carbonate is dispersed poorly: this means that the grains of calcium carbonate are not distributed in a natural and uniform manner in a chlorinated thermoplastic resin, notably a PVC-based one, when they are incorporated in the said resin. The skilled man in the art therefore knows that calcium carbonate, when it is not treated or used with a compatibilising agent, does not have satisfactory compatibility with chlorinated thermoplastic resins. This poor distribution or this poor state of dispersion, or again this poor compatibility, leads in the chlorinated and filled thermoplastic material to lesser mechanical properties (such as, notably, its impact resistance), and to degraded optical properties (such as, notably, its brightness).

For many years, therefore, the skilled man in the art has developed methods for treating calcium carbonate, with a view to improving its compatibility with thermoplastic resins in general, and chlorinated thermoplastic resins, notably PVC.

Historically, the role which fatty acids can play as a compatibilising agent of calcium carbonate was first brought to light. Thus, document FR 1 047 087 describes the use of substances to coat calcium carbonate, which substances are chosen from among fatty acids, fatty alcohols, waxes and natural or synthetic resins, or again surfactants. The substances can be used during a grinding stage (in a dry medium or an aqueous medium), a drying stage or a selection stage. This document highlights in particular stearic acid which, used in the form of dry powder or emulsion, enables calcium carbonate to be treated in the previously mentioned stages, thus improving its compatibility with the hydrophobic media in which it is likely to be introduced, such as plastics, or again paints in the solvent phase.

The use of fatty acids to treat calcium carbonate is found again in more recent documents. This is the case of document WO 00/20336, which describes the treatment of calcium carbonate by at least one fatty acid salt having 10 to 24 carbon atoms, and more specifically by stearic acid and its calcium salt. This is also the case of document U.S. Pat. No. 4,151,136, which describes the surface treatment of calcium carbonate by an acid having 8 to 22 carbon atoms, and preferentially by stearic acid, with the mineral material treated in this manner then being encapsulated in a polymer matrix.

By this means other compatibilising agents have therefore been developed, such as titanates, aluminates, or again sililated compounds.

As such, on may cite document CN 1 542 040, which describes the use of titanates, aluminates or silanes as agents for treatment of calcium carbonate, enabling the said carbonate to be introduced into a polyethylene matrix. By this means it is possible to manufacture filled polyethylene-based pipes, the rigidity of which is improved.

One may also cite document FR 2 326 425, which describes the use of organotitanate compounds as agents for treatment of finely divided inorganic materials, such as notably calcium carbonate. These compounds improve the compatibility of the mineral matter with the polymer materials in which they are incorporated after having been treated by the said organotitanate compounds. It is thus possible to disperse larger quantities of inorganic materials in these polymer materials than in the case of the same mineral materials which have not been treated by these organotitanate-based compounds.

There are also documents which describe the use of several treatments of calcium carbonate, with a view to making it compatible with different thermoplastic materials (such as notably chlorinated thermoplastic materials).

Thus, document WO 02/55596 reveals a treatment using a polydialkysiloxane and a fatty acid having at least 10 carbon atoms, where this acid is preferentially stearic acid. The carbonate thus treated is made hydrophobic, which facilitates its incorporation in thermoplastic materials, such as notably polyolefins intended for the manufacture of breathable films.

Document WO 04/09711 describes the use of 3 calcium carbonate treatment agents: silicon dioxide, a fatty acid such as notably stearin, and a silane compound. The calcium carbonate thus modified is intended for plastic applications.

Lastly, document WO 01/32787 teaches the treatment of calcium carbonate by means of stearic acid and calcium distearate, with a view to introducing the said carbonate into plastics.

This state of the technique demonstrates the predominant role, as perceived by the skilled man in the art, of compounds of the fatty acid type, and notably stearin and its salts, as an agent for treatment of calcium carbonate in order to make it more compatible with thermoplastic materials in which it is intended to be used, and notably chlorinated thermoplastic resins such as PVC.

However, the use of these products undoubtedly poses serious problems for the skilled man in the art.

Firstly, if it is decided to treat the calcium carbonate using stearic acid, the rate of conversion of the said acid into stearate on the surface of the calcium carbonate depends greatly on certain parameters of the treatment process, which it is very difficult to control accurately: notably the temperature at which the treatment is undertaken, and the stearic acid flow rate.

It is also necessary to know that the skilled man in the art, at the time of incorporating the calcium carbonate treated by stearic acid or its salts into the PVC formulation, adds to the said formulation an additional quantity of stearin; the latter plays the role of lubricant in the formulation. It is then possible to observe a phenomenon of superlubrication, where the stearin added at the time of the formulation is in addition to the stearic acid which was used to treat the calcium carbonate. The consequences well-known to the skilled man in the art are a yellowing of the thermoplastic materials obtained, and of the deposits of stearin which exudes when extracted from the die ("die build-up").

Finally, it must be said that over the years the skilled man in the art has sought to manufacture increasingly fine calcium carbonates (notably through various grinding processes), developing increasingly large specific areas. As a consequence, the quantity of stearic acids or of its salts used is increasingly high, with a view to recovering or treating the entire surface of these refined calcium carbonates: this factor therefore inevitably amplifies the previously listed disadvantages, which are encountered in connection with the use of stearic acid and its salts to treat calcium carbonate.

There therefore exists a genuine requirement to find an effective treatment agent of calcium carbonate, with a view to making the latter compatible with the chlorinated thermoplastic materials for which it is intended, and enabling stearic acid or its salts to be reduced or even eliminated completely from the process of treatment of the said calcium carbonate.

Continuing its research in this area, the Applicant has developed the use, as a compatibilising agent of a mineral filler, in a process of manufacture of a chlorinated thermoplastic material containing at least one mineral filler, of at least one polymer characterised in that it is a comb polymer containing at least one polyalkylene oxide group grafted on to at least one anionic monomer with ethylenic unsaturation.

This use enables mineral fillers to be obtained the compatibility of which is improved with the chlorinated thermoplastic materials in which they are incorporated, whilst reducing or sometimes even eliminating the stearin, or the stearic acid salts used in the prior art. A particular application of these results consists in increasing the rate of calcium carbonate in a chlorinated thermoplastic material, using the same quantity of stearic acid or of its salts as in the prior art.

This improved compatibility in the presence of the polymers according to the invention leads directly to improved impact-resistance and brightness properties for the end material. By improving the above-mentioned properties, the use of the polymers according to the present invention enables the quantity of stearin or of its salts used to be reduced, and sometimes the treatment by stearin or its salts to be eliminated completely.

The Applicant wishes to stress that improved mechanical properties such as impact-resistance, and improved optical properties such as brightness, do indeed constitute a direct proof of an improved compatibility of the mineral filler with the thermoplastic material (in general) in which it is used. With this regard, the document "Study on ground-calcium carbonate and wollastonite composite fillers filling properties and reinforcement mechanisms" (Zhongguo Fenti Jishu, 2002, 8 (1), pp. 1-5) stresses the direct relationship between an improved impact resistance for a PVC material filled by calcium carbonate, and an improved state of dispersion of the said carbonate in the present PVC resin. Similarly, the document "Recycling of incompatible plastics with reactive compatibilizers" (Special Publication—Royal Society of Chemistry, 1997, 199 Chemical Aspects of Plastics Recycling, pp. 170-179) indicates that the mechanical and optical properties of a filled plastic depend on the choice of the compatibilising agent, and therefore on the satisfactory state of dispersion of the filler in the said plastic. Lastly, the document "Labor-saving method of testing the dispersibility of titanium dioxide Pigments" (FATIPEC Congress (1988), Vol. III(19th), 307-19) directly relates the state of dispersion of titanium dioxide-based pigments in a polymeric film to the brightness of the said film.

Therefore, the use of at least one polymer characterised in that it is a comb polymer containing at least one polyalkylene oxide group grafted on to at least one anionic monomer with ethylenic unsaturation, in a process to manufacture a chlorinated thermoplastic material containing at least one mineral filler, enables the compatibility of the said filler with the chlorinated thermoplastic resin to be improved, whilst minimising or eliminating the quantity of stearic acid and its salts used. A particular application of these results consists in increasing the rate of calcium carbonate in a chlorinated thermoplastic material, using the same quantity of stearic acid or of its salts as in the prior art.

Without wishing to be bound to any particular theory, the Applicant holds the view that the polymers used according to the present invention favour compatibility of the calcium carbonate with a chlorinated thermoplastic resin since, firstly, the grafted polyalkylene oxide group has a high degree of affinity for the chlorinated thermoplastic resin while, secondly, the backbone of the said polymer with a base of at least one anionic monomer with ethylenic unsaturation has a high degree of affinity for the calcium carbonate.

The Applicant is keen to stress that such polymers are already known, but described in documents which do not resolve the same technical problem as that addressed by the present invention, and for functions which are very different from that forming the subject of the present invention.

Thus, in the paper field, document WO 2004/044022 describes the use as an agent improving the activation of optical brightening of coated paper, of a water-soluble copolymer having at least one alkoxy or hydroxy polyalkylene glycol group grafted on to a least one ethylenic unsaturated monomer.

One is also familiar with French Patent Application n° 05 12797, which is not yet published on the date of filing of the present Application, and which describes a process for manufacture of paper coatings by the introduction into the said coatings of at least one comb polymer obtained by grafting of at least one polyalkylene oxide group on to the polymer chain, where the said chain results from the polymerisation of at least one ethylenic unsaturated monomer; by this means paper coatings having an improved (higher) Brookfield™ viscosity and water retention than with the use of a water retaining thickening agent according to the prior art are obtained. The two above-mentioned documents do not in any case concern the field of plastics; nor do they concern the technical problem posed in the case of the present invention.

In the sector of grinding of mineral matter, one is also familiar with document WO 2004/041882, which describes the use, as a grinding aid agent, of a weakly ionic copolymer which is water-soluble, with at least one ethylenic unsaturation anionic monomer, at least one non-ionic ethylenic unsaturation monomer, and at least one organofluorinate or organosililate monomer. The function of this copolymer, which is very different from that forming the subject of the present Application, is that of facilitating the mechanical grinding action, with a view to obtaining aqueous suspensions of refined mineral matter, the dry matter concentration of which may be high, of low Brookfield™ viscosity which is stable over time, and having a pigment surface the ionic charge of which, determined by ionic titration, is low; by this means it is possible to minimise the demand for a cationic polymer agent during manufacture of the paper, which constitutes the basic technical problem of document WO 2004/041882, something which is far removed from the problem resolved in the present Application. The skilled man in the art therefore draws no lesson from this document, with a view to resolving the technical problem addressed by the present Application.

Lastly, the skilled man in the art is familiar with two documents which resolve technical problems different from the one in the present Application, by the use of polymers the functions of which are different from that played by the polymers in the present Application, but in which the use of calcium carbonate in plastics is found. The skilled man in the art therefore draws no lesson from these documents with a view to resolving the technical problem forming the subject of the present Application.

The skilled man in the art is thus familiar with document WO 2004/041883, which describes the use of a hydrosoluble copolymer, preferably a weakly ionic one, which has at least one alkoxy or hydroxy polyalkylene glycol group grafted on to at least one ethylenic unsaturated monomer, as an agent improving the brightness of the end product, and notably brightness in the sheet of paper, whatever the angle of vision, i.e. an angle of between 20° and 85°, and more specifically between 45° and 75°. This is therefore a document centring essentially on paper. The skilled man in the art therefore finds in this document no objective element revealing to him or suggesting to him that the use of such copolymers would enable the quantity of stearic acid or its salts, commonly used when one introduces calcium carbonate into a chlorinated thermoplastic material, to be reduced.

Finally, the skilled man in the art is also familiar with Patent Application n° 05 11274, which has not yet been published on the date of filing of the present Application. The document describes a process to manufacture a thermoplastic resin charged with mineral matter, and possibly containing an organic impact modifier, through the introduction into the said resin of a comb polymer with at least one ethylenic unsaturation monomer, to which is grafted at least one polyalkylene oxide group. This invention also concerns the thermoplastic materials thus obtained, which have an improved impact resistance and a maintained rigidity, compared to the same compositions not containing the said comb polymers. There are two fundamental differences between this document and the present invention. Firstly, this document does not concern the problem of the compatibility of the mineral filler with the thermoplastic resin into which it is subsequently introduced. Secondly, it is expressly stated, in a preamble to the examples which illustrate Patent Application n° 05 11274, that all the calcium carbonates used have been subjected to a treatment using a fatty acid: this document does not therefore reveal that it is possible to reduce or even eliminate the quantity of this acid used, whilst preserving the compatibility of the filler with the chlorinated thermoplastic resin in which it is used.

A first object of the invention therefore consists in using, as a compatibilising agent of a mineral filler, in a process of manufacture of a chlorinated thermoplastic material containing at least one mineral filler, of at least one polymer characterised in that it is a comb polymer containing at least one polyalkylene oxide group grafted on to at least one anionic monomer with ethylenic unsaturation.

This use is also characterised in that the said comb polymer is used during the process of manufacture of a chlorinated thermoplastic material, depending on the method:

1. in the form of dry powder, resulting from the stages of:
   grinding and/or dispersion in an aqueous medium of the mineral filler in the presence of the said polymer, and possibly in the presence of at least one other grinding agent in an aqueous medium and/or at least one other dispersant,
   drying of the dispersion and/or of the aqueous suspension of mineral matter obtained, with possible introduction of the said polymer, and possible treatment followed by classification of the powder obtained 2. and/or in the form of dry powder, resulting from the stages of:
   dry grinding of the mineral filler in the presence of the said polymer, and possibly in the presence of at least one other dry grinding agent,
   possible treatment and classification of the powder obtained, 3. and/or in the form of dry powder, resulting from the stages of:
   introduction of the said polymer into a dispersion and/or into an aqueous suspension containing the mineral filler,
   drying of the dispersion and/or of the aqueous suspension of mineral matter obtained, with possible introduction of the said polymer, and possible treatment followed by classification of the powder obtained, 4. and/or in the form of dry powder, resulting from the stages of:
   drying of a dispersion and/or into an aqueous suspension containing the mineral filler in the presence of the said polymer,
   possible treatment and classification of the powder obtained, 5. and/or in the form of a dry powder, resulting from the stages of drying of a solution and/or of an emulsion containing the said polymer and at least one other compound chosen from among a thermal stabiliser and/or a UV stabiliser and/or a lubricant and/or a rheology modifier and/or an impact modifier and/or a processability agent, 6. and/or in the form of dry powder mixed with a chlorinated thermoplastic resin and a mineral filler, and preferentially according to method 1, and/or method 2, and/or method 3, and/or method 5.

The Applicant states that the term "treatment" used in the description of each of the previous 6 methods makes reference to the use of a chemical treatment agent.

It is also keen to indicate that the said comb polymer, when it is used according to one of the 6 methods described above—except for the method referenced as 6—can be in the state of dry powder and/or in the liquid state, i.e. in the form of an emulsion or an aqueous suspension. In concrete terms, the said polymer is added in the form of a dry powder and/or in liquid form during the grinding in a wet medium (mode 1) or when dry (mode 2), and/or into a dispersion or an aqueous suspension containing the mineral filler (mode 3), and/or during the drying of a dispersion or an aqueous suspension containing the mineral filler (mode 4), and/or during the mixing of the said polymer with at least one other compound chosen from among a thermal stabiliser and/or a UV stabiliser and/or a lubricant and/or a rheology modifier and/or an impact modifier and/or a processability agent (mode 5).

Another compatibilising agent, such as notably stearic acid or its salts, may be added during the drying stages, but in a smaller quantity than in the processes described in the prior art, since this is the goal sought by the present invention: by reducing the quantity of stearic acid or of its salts used, and sometimes even eliminating this type of product the disadvantages (as described previously) relating to the use of the said products are reduced, whilst the compatibility of the mineral filler with the chlorinated thermoplastic resin in which it is dispersed is maintained or improved.

The use according to the invention of at least one comb polymer as a compatibilising agent of a mineral filler, in a process to manufacture a chlorinated thermoplastic resin containing at least one mineral filler, is also characterised in that the chlorinated thermoplastic resin is chosen from among PVC, post-chlorinated polyvinyl chloride (PVCC), chlorinated polyethylene, copolymers of the PVC-vinyl polyacetate type (PVC-PVAC), and their blends.

The use according to the invention of a least one comb polymer as a compatibilising agent of a mineral filler, in a process to manufacture a chlorinated thermoplastic material containing at least one mineral filler, is also characterised in that the said chlorinated thermoplastic material is intended for the manufacture of tubes, such as notably for the conveyance of water, drainage, irrigation, sheaths for the passage of cables, or again intended for the manufacture of external and/or internal construction materials, such as notably window profiles, shutters, doors, cladding, false ceilings, or again intended for the manufacture of industrial parts.

The use according to the invention of a least one comb polymer as a compatibilising agent of a mineral filler, in a process to manufacture a chlorinated thermoplastic material containing at least one mineral filler, is also characterised in that the mineral filler is chosen from among natural or synthetic calcium carbonate, the dolomites, limestone, kaolin, talc, gypsum, titanium oxide, satin white, or again aluminium trihydroxide, mica, carbon black, and blends of these fillers one with another, such as blends of talc and calcium carbonate, calcium carbonate and kaolin, or again blends of calcium carbonate with aluminium trihydroxide, or again blends with synthetic natural fibres, or again co-structures of minerals such as talc-calcium carbonate or talc-titanium dioxide co-structures, preferentially in that it is a mineral filler chosen from among natural or synthetic calcium carbonate, or their blends, and extremely preferentially in that it is a natural calcium carbonate chosen from among marble, calcite, chalk or their blends.

The use according to the invention of a least one comb polymer as a compatibilising agent of a mineral filler, in a process to manufacture a chlorinated thermoplastic material containing at least one mineral filler, is also characterised in that the said process uses:
(a) between 0.1 and 99% by dry weight of at least one chlorinated thermoplastic resin, compared to the total weight of the chlorinated thermoplastic formulation,
(b) between 0.1 and 90% by dry weight of at least one mineral filler, compared to the total weight of the chlorinated thermoplastic formulation,
(c) between 0.01 and 5%, and preferentially between 0.1 and 3%, by dry weight of a comb polymer consisting of at least one anionic monomer with ethylenic unsaturation on to which is grafted at least one polyalkylene oxide group, compared to the dry weight of mineral filler,
(d) between 0 and 20%, and preferentially between 5 and 20%, by dry weight of a thermal stabiliser and/or a UV stabiliser and/or a lubricant and/or a rheology modifier and/or an impact modifier and/or a processability agent, compared to the total weight of the chlorinated thermoplastic formulation,
(e) between 0 and 3%, and preferentially between 0 and 1%, and very preferentially between 0 and 0.5%, and extremely preferentially between 0 and 0.2%, by dry weight relative to the dry weight of mineral filler, of another compatibility agent than the said comb polymer, where this compatibility agent is preferentially constituted by at least one fatty acid having 8 to 20 carbon atoms, and where this compatibility agent is very preferentially chosen from among stearic acid or its salts, or their blends, and where the stearic acid salt is preferentially a calcium salt.

The use according to the invention of a least one comb polymer as a compatibilising agent of a mineral filler, in a process to manufacture a chlorinated thermoplastic material containing at least one mineral filler, is also characterised in that the said comb polymer contains at least one monomer of formula (I):

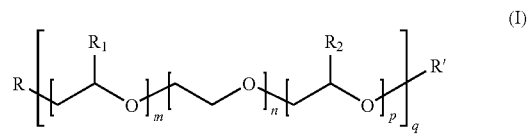

where:
m and p represent a number of alkylene oxide groups of less than or equal to 150,
n represents a number of ethylene oxide groups of less than or equal to 150,
q represents an integer at least equal to 1 and such that $5 \leq (m+n+p)q \leq 150$,
$R_1$ represents hydrogen or the methyl or ethyl radical,
$R_2$ represents hydrogen or the methyl or ethyl radical,
R represents a radical containing an unsaturated polymerisable group, preferentially belonging to the group of vinylics, or to the group of acrylic, methacrylic, maleic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
R' represents hydrogen or a hydrocarbonated radical having 1 to 40 carbon atoms, or an ionic or ionisable grouping such as a phosphate, a phosphonate, a sulphate, a sulphonate, a carboxylic, or indeed a primary, secondary or tertiary amine, or a quaternary ammonium, or indeed their blends, and preferentially represents a hydrocarbonated radical having 1 to 12 carbon atoms, and very preferentially a hydrocarbonated radical having 1 to 4 carbon atoms, The use according to the invention of a least one comb polymer as a compatibilising agent of a mineral filler, in a process to manufacture a chlorinated thermoplastic material containing at least one mineral filler, is also characterised in that the said comb polymer consists:
- a) of at least one anionic monomer with ethylenic unsaturation and with a monocarboxylic or dicarboxylic or phosphoric or phosphonic or sulphonic group, or their blends,
- b) of at least one non-ionic monomer, where the non-ionic monomer consists of at least one monomer of formula (I):

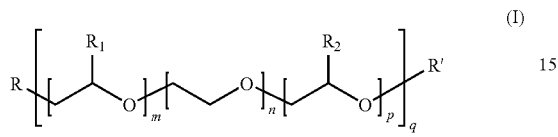

where:
- m and p represent a number of alkylene oxide groups of less than or equal to 150,
- n represents a number of ethylene oxide groups of less than or equal to 150,
- q represents an integer at least equal to 1 and such that $5 \leq (m+n+p)q \leq 150$, and preferentially such that $15 \leq (m+n+p)q \leq 120$
- $R_1$ represents hydrogen or the methyl or ethyl radical,
- $R_2$ represents hydrogen or the methyl or ethyl radical,
- R represents a radical containing an unsaturated polymerisable group, preferentially belonging to the group of vinylics, or to the group of acrylic, methacrylic, maleic esters, or to the group of unsaturated urethanes such as, preferentially, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
- R' represents hydrogen or a hydrocarbonated radical having 1 to 40 carbon atoms, or an ionic or ionisable grouping such as a phosphate, a phosphonate, a sulphate, a sulphonate, a carboxylic, or indeed a primary, secondary or tertiary amine, or a quaternary ammonium, or indeed their blends, and preferentially represents a hydrocarbonated radical having 1 to 12 carbon atoms, and very preferentially a hydrocarbonated radical having 1 to 4 carbon atoms.

or a blend of several monomers of formula (I),
- c) possibly at least one monomer of the acrylamide or methacrylamide type, or their derivates such as N-[3-(dimethylamino)propyl]acrylamide or N-[3-(dimethylamino)propyl]methacrylamide, and their blends, or again of at least one non-water soluble monomer such as the alkyl acrylates or methacrylates, the unsaturated esters such as N-[2-(dimethylamino)ethyl]methacrylate, or N-[2-(dimethylamino)ethyl]acrylate, the vinylics such as vinyl acetate, vinylpyrrolidone, styrene, alphamethylstyrene and their derivates, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or again at least one organofluorate or organosililate monomer, or a blend of several of these monomers,
- d) possibly at least one monomer having at least two ethylenic unsaturations called in the remainder of the Application a grafting monomer, The use according to the invention of a least one comb polymer as a compatibilising agent of a mineral filler, in a process to manufacture a chlorinated thermoplastic material containing at least one mineral filler, is also characterised in that the said comb polymer consists:
- a) of at least one anionic monomer with ethylenic unsaturation and with a monocarboxylic function preferentially chosen from among acrylic or methacrylic acid, or again the diacid hemiesters such as the $C_1$ to $C_4$ monoesters of maleic or itaconic acids, or chosen from among the monomers with ethylenic unsaturation and with a dicarboxylic function and preferentially from among itaconic or maleic acid, or again from among the anhydrides of carboxylic acids, such as preferentially maleic anhydride, or chosen from among the monomers with ethylenic unsaturation and with a sulphonic function such as preferentially acrylamido-methyl-propane-sulphonic acid, sodium methallylsulphonate, vinyl sulphonic acid and styrene sulphonic acid, or again chosen from among the monomers with ethylenic unsaturation and with a phosphoric function such as preferentially vinyl phosphoric acid, ethylene glycol methacrylate phosphate, propylene glycol methacrylate phosphate, ethylene glycol acrylate phosphate, propylene glycol acrylate phosphate and their ethoxylates, or again chosen from among the monomers with ethylenic unsaturation and with a phosphonic function such as vinyl phosphonic acid, or blends of these monomers,
- b) of a least one monomer with a non-ionic ethylenic unsaturation of formula (I):

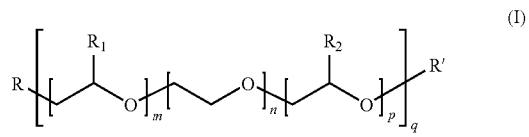

where:
- m and p represent a number of alkylene oxide groups of less than or equal to 150,
- n represents a number of ethylene oxide groups of less than or equal to 150,
- q represents a whole number at least equal to 1 and such that $5 \leq (m+n+p)q \leq 150$, and preferentially such that $15 \leq (m+n+p)q \leq 120$,
- $R_1$ represents hydrogen or the methyl or ethyl radical,
- $R_2$ represents hydrogen or the methyl or ethyl radical,
- R represents a radical containing an unsaturated polymerisable group, preferentially belonging to the group of vinylics, or to the group of acrylic, methacrylic, maleic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
- R' represents hydrogen or a hydrocarbonated radical having 1 to 40 carbon atoms, or an ionic or ionisable grouping such as a phosphate, a phosphonate, a sulphate, a sulphonate, a carboxylic, or indeed a primary, secondary or tertiary amine, or a quaternary ammonium, or indeed their blends, and preferentially represents a hydrocarbonated radical having 1 to 12 carbon atoms, and very preferentially a hydrocarbonated radical having 1 to 4 carbon atoms.

or a blend of several monomers of formula (I), c) possibly at least one monomer of the acrylamide or methacrylamide type, or their derivates such as N-[3-(dimethylamino)propyl]acrylamide or N-[3-(dimethylamino)propyl]methacrylamide, and their blends, or again of at least one non-water soluble monomer such as the alkyl acrylates or methacrylates, the unsaturated esters such as N-[2-(dimethylamino)ethyl]methacrylate, or N-[2-(dimethylamino)ethyl]acrylate, the vinylics such as vinyl acetate, vinylpyrrolidone, styrene, alphamethylstyrene and their derivatives, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or again at least one organofluorate monomer, or again at least one organosililate monomer, or their blends, d) and possibly at least one crosslinking monomer preferentially chosen from the group constituted by ethylene glycol dimethacrylate, trimethylolpropanetriacrylate, allyl acrylate, the allyl maleates, methylene-bis-acrylamide, methylene-bis-methacrylamide, tetrallyloxyethane, the triallylcyanurates, the allyl ethers obtained from polyols such as pentaerythritol, sorbitol, sucrose or their blends.

The use according to the invention of a least one comb polymer as a compatibilising agent of a mineral filler, in a process to manufacture a chlorinated thermoplastic material containing at least one mineral filler, is also characterised in that the said comb polymer consists, expressed by weight:

a) between 2% and 95%, preferentially between 5% and 50%, very preferentially between 5% and 25% of at least one anionic monomer with ethylenic unsaturation and with a monocarboxylic function preferentially chosen from among acrylic or methacrylic acid, or again the diacid hemiesters such as the $C_1$ to $C_4$ monoesters of maleic or itaconic acids, or chosen from among the monomers with ethylenic unsaturation and with a dicarboxylic function and preferentially from among itaconic or maleic acid, or again from among the anhydrides of carboxylic acids, such as preferentially maleic anhydride, or chosen from among the monomers with ethylenic unsaturation and with a sulphonic function such as preferentially acrylamido-methyl-propane-sulphonic acid, sodium methallylsulphonate, vinyl sulphonic acid and styrene sulphonic acid, or again chosen from among the monomers with ethylenic unsaturation and with a phosphoric function such as preferentially vinyl phosphoric acid, ethylene glycol methacrylate phosphate, propylene glycol methacrylate phosphate, ethylene glycol acrylate phosphate, propylene glycol acrylate phosphate and their ethoxylates, or again chosen from among the monomers with ethylenic unsaturation and with a phosphonic function such as vinyl phosphonic acid, or blends of these monomers, b) between 2% and 95%, preferentially between 50% and 95%, and very preferentially between 70% and 95%, of at least one non-ionic monomer with ethylenic unsaturation, of formula (I):

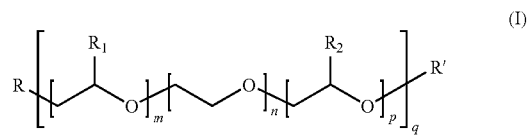

where:
m and p represent a number of alkylene oxide groups of less than or equal to 150,
n represents a number of ethylene oxide groups of less than or equal to 150,
q represents a whole number at least equal to 1 and such that $5 \leq (m+n+p)q \leq 150$, and preferentially such that $15 \leq (m+n+p)q \leq 120$,
$R_1$ represents hydrogen or the methyl or ethyl radical,
$R_2$ represents hydrogen or the methyl or ethyl radical,
R represents a radical containing an unsaturated polymerisable group, preferentially belonging to the group of vinylics, or to the group of acrylic, methacrylic, maleic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
R' represents hydrogen or a hydrocarbonated radical having 1 to 40 carbon atoms, or an ionic or ionisable grouping such as a phosphate, a phosphonate, a sulphate, a sulphonate, a carboxylic, or indeed a primary, secondary or tertiary amine, or a quaternary ammonium, or indeed their blends, and preferentially represents a hydrocarbonated radical having 1 to 12 carbon atoms, and very preferentially a hydrocarbonated radical having 1 to 4 carbon atoms.

or a blend of several monomers of formula (I), c) between 0% and 50% of at least one monomer of the acrylamide or methacrylamide type, or their derivates such as N-[3-(dimethylamino)propyl]acrylamide or N-[3-(dimethylamino)propyl]methacrylamide, and their blends, or again of at least one non-water soluble monomer such as the alkyl acrylates or methacrylates, the unsaturated esters such as N-[2-(dimethylamino)ethyl]methacrylate, or N-[2-(dimethylamino)ethyl]acrylate, the vinylics such as vinyl acetate, vinylpyrrolidone, styrene, alphamethylstyrene and their derivatives, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido) propyl]trimethyl ammonium chloride or sulphate, dimethyl diallyl ammonium chloride or sulphate, [3-(methacrylamido)propyl]trimethyl ammonium chloride or sulphate, or again at least one organofluorate monomer, or again at least one organosililate monomer, or their blends, d) between 0% and 3% of at least one crosslinking monomer chosen preferentially from the group constituted by ethylene glycol dimethacrylate, trimethylolpropanetriacrylate, allyl acrylate, the allyl maleates, methylene-bis-acrylamide, methylene-bis-methacrylamide, tetrallyloxyethane, the triallylcyanurates, the allyl ethers obtained from polyols such as pentaerythritol, sorbitol, sucrose or their blends, where the total proportions of the constituents a), b), c) and d) are equal to 100%.

The polymer used according to the invention is obtained by processes of radical polymerisation in solution, in a direct or reverse emulsion, in suspension or precipitation in solvents, in the presence of catalytic systems and transfer agents, or again by processes of controlled radical polymerisation, and preferentially by nitroxide mediated polymerisation (NMP) or by cobaloximes, by atom transfer radical polymerisation (ATRP), by controlled radical polymerisation by sulphurated derivatives, chosen from among carbamates, dithioesters or trithiocarbonates (RAFT) or xanthates.

This polymer obtained in the acid form, and possibly distilled, may also be partially or totally neutralised by one or more neutralisation agents having a monovalent neutralising function or a polyvalent neutralising function such as, for example, for the monovalent function of those chosen from the group constituted by the alkaline cations, very preferentially sodium, potassium, lithium, ammonium or the primary, secondary or tertiary aliphatic and/or cyclic amines, such as, for example, stearylamine, the ethanolamines (mono-, di-, triethanolamine), mono- and diethylamine, cyclohexylamine, methylcyclohexylamine, amino methyl propanol, morpholine, or again, for the polyvalent function, those chosen from the group constituted by the alkaline earth divalent cations, very preferentially magnesium and calcium, or again zinc, and also by the trivalent cations, of which very preferentially aluminium, or again by certain cations of higher valency.

Each neutralisation agent then acts with neutralisation rates inherent to each valency function.

According to another variant, the polymer derived from the polymerisation reaction may also be, before or after the total or partial neutralisation reaction, treated and separated into several phases, according to static or dynamic processes known to the skilled man in the art, by one or more polar solvents belonging notably to the group constituted by water, methanol, ethanol, propanol, isopropanol, the butanols, acetone, tetrahydrofuran or their blends.

One of the phases then corresponds to the copolymer used according to the invention as an agent allowing an improvement of the compatibility of the mineral filler with the chlorinated thermoplastic resin in which it is dispersed.

According to another variant, the said polymer may be dried.

Another object of the invention lies in a chlorinated thermoplastic material containing:
(a) at least one chlorinated thermoplastic resin,
(b) at least one mineral filler,
(c) at least one compatibility agent which consists of at least one comb polymer, containing at least one polyalkylene oxide group grafted on to at least one anionic monomer with ethylenic unsaturation,
(d) possibly at least one other compound chosen from among a thermal stabiliser and/or a UV stabiliser and/or a lubricant and/or a rheology modifier and/or an impact modifier and/or a processability agent,
(e) possibly at least one other compatibility agent other than the said comb polymer, this compatibility agent preferentially consisting of at least one fatty acid having 8 to 20 carbon atoms, this compatibility agent being very preferentially chosen from among stearic acid or its salts or their blends, and the salt of stearic acid preferentially being a calcium salt.

The chlorinated thermoplastic material according to the invention is also characterised in that the chlorinated thermoplastic resin is chosen from among PVC, post-chlorinated polyvinyl chloride (PVCC), chlorinated polyethylene, the copolymers of the PVC-vinyl polyacetate type (PVC-PVAC), and their blends The chlorinated thermoplastic material according to the invention is also characterised in that it is intended for the manufacture of tubes, such as notably for the conveyance of water, drainage, irrigation, sheaths for the passage of cables, or again intended for the manufacture of external and/or internal construction materials, such as notably window profiles, shutters, doors, cladding, false ceilings, or again intended for the manufacture of industrial parts.

The chlorinated thermoplastic material according to the invention is also characterised in that the mineral filler is chosen from among natural or synthetic calcium carbonate, the dolomites, kaolin, talc, gypsum, titanium dioxide, satin white or again aluminium trihydroxide, mica, carbon black and a blend of more than one of these fillers together, such as talc-calcium carbonate, calcium carbonate-kaolin blends, or again blends of calcium carbonate with aluminium trihydroxide, or again blends with synthetic or natural fibres, or again mineral co-structures such as talc-calcium carbonate or talc-titanium dioxide co-structures, preferentially in that it is a mineral filler chosen from among natural or synthetic calcium carbonate, talc and blends of these fillers, very preferentially in that it is a mineral filler chosen from among natural or synthetic calcium carbonate or their blends, and extremely preferentially in that it is a natural calcium carbonate chosen from among marble, calcite, chalk or their blends.

The chlorinated thermoplastic material according to the invention is also characterised in that it contains:
(a) between 0.1 and 99% by dry weight of at least one chlorinated thermoplastic resin, compared to the total weight of the thermoplastic formulation,
(b) between 0.1 and 90% by dry weight of at least one mineral filler, compared to the total weight of the chlorinated thermoplastic formulation,
(c) between 0.01 and 5%, and preferentially between 0.1 and 3%, by dry weight of a comb polymer consisting of at least one anionic monomer with ethylenic unsaturation on to which is grafted at least one polyalkylene oxide group, compared to the dry weight of mineral filler,
(d) between 0 and 20%, and preferentially between 5 and 20%, by dry weight of a thermal stabiliser and/or a UV stabiliser and/or a lubricant and/or a rheology modifier and/or an impact modifier and/or a processability agent, compared to the total weight of the chlorinated thermoplastic formulation,
(e) between 0 and 3%, and preferentially between 0 and 1%, and very preferentially between 0 and 0.5%, and extremely preferentially between 0 and 0.2%, by dry weight relative to the dry weight of mineral filler, of another compatibility agent than the said comb polymer, where this compatibility agent is preferentially constituted by at least one fatty acid having 8 to 20 carbon atoms, and where this compatibility agent is very preferentially chosen from among stearic acid or its salts, or their blends, and where the stearic acid salt is preferentially a calcium salt.

The chlorinated thermoplastic material according to the invention is also characterised in that the comb polymer used as a compatibilising agent contains at least one monomer of formula (I):

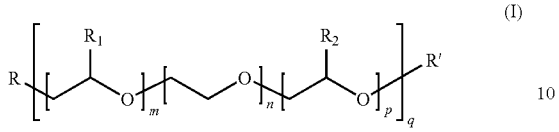

where:
- m and p represent a number of alkylene oxide groups of less than or equal to 150,
- n represents a number of ethylene oxide groups of less than or equal to 150,
- q represents an integer at least equal to 1 and such that $5 \leq (m+n+p)q \leq 150$,
- $R_1$ represents hydrogen or the methyl or ethyl radical,
- $R_2$ represents hydrogen or the methyl or ethyl radical,
- R represents a radical containing an unsaturated polymerisable group, preferentially belonging to the group of vinylics, or to the group of acrylic, methacrylic, maleic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
- R' represents hydrogen or a hydrocarbonated radical having 1 to 40 carbon atoms, or an ionic or ionisable grouping such as a phosphate, a phosphonate, a sulphate, a sulphonate, a carboxylic, or indeed a primary, secondary or tertiary amine, or a quaternary ammonium, or indeed their blends, and preferentially represents a hydrocarbonated radical having 1 to 12 carbon atoms, and very preferentially a hydrocarbonated radical having 1 to 4 carbon atoms, The chlorinated thermoplastic material according to the invention is also characterised in that the comb polymer used as a compatibilising agent consists:

(a) of at least one anionic monomer with ethylenic unsaturation and with a monocarboxylic or dicarboxylic or phosphoric or phosphonic or sulphonic group, or their blends, (b) of at least one non-ionic monomer, where the non-ionic monomer consists of at least one monomer of formula (I):

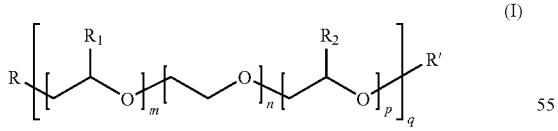

where:
- m and p represent a number of alkylene oxide groups of less than or equal to 150,
- n represents a number of ethylene oxide groups of less than or equal to 150,
- q represents an integer at least equal to 1 and such that $5 \leq (m+n+p)q \leq 150$, and preferentially such that $15 \leq (m+n+p)q \leq 120$
- $R_1$ represents hydrogen or the methyl or ethyl radical,
- $R_2$ represents hydrogen or the methyl or ethyl radical,
- R represents a radical containing an unsaturated polymerisable group, preferentially belonging to the group of vinylics, or to the group of acrylic, methacrylic, maleic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
- R' represents hydrogen or a hydrocarbonated radical having 1 to 40 carbon atoms, or an ionic or ionisable grouping such as a phosphate, a phosphonate, a sulphate, a sulphonate, a carboxylic, or indeed a primary, secondary or tertiary amine, or a quaternary ammonium, or indeed their blends, and preferentially represents a hydrocarbonated radical having 1 to 12 carbon atoms, and very preferentially a hydrocarbonated radical having 1 to 4 carbon atoms.

or a blend of several monomers of formula (I), (c) possibly at least one monomer of the acrylamide or methacrylamide type, or their derivates such as N-[3-(dimethylamino)propyl]acrylamide or N-[3-(dimethylamino)propyl]methacrylamide, and their blends, or again of at least one non-water soluble monomer such as the alkyl acrylates or methacrylates, the unsaturated esters such as N-[2-(dimethylamino)ethyl]methacrylate, or N-[2-(dimethylamino)ethyl]acrylate, the vinylics such as vinyl acetate, vinylpyrrolidone, styrene, alphamethylstyrene and their derivates, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido)propyl] trimethyl ammonium chloride or sulphate, dimethyl diallyl ammonium chloride or sulphate, [3-(methacrylamido)propyl]trimethyl ammonium chloride or sulphate, or again at least one organofluorate or organosililate monomer, or their blends, (d) possibly of at least one cross-linking monomer, The chlorinated thermoplastic material according to the invention is also characterised in that the comb polymer used as a compatibilising agent consists:

a) of at least one anionic monomer with ethylenic unsaturation and with a monocarboxylic function preferentially chosen from among acrylic or methacrylic acid, or again the diacid hemiesters such as the $C_1$ to $C_4$ monoesters of maleic or itaconic acids, or chosen from among the monomers with ethylenic unsaturation and with a dicarboxylic function and preferentially from among itaconic or maleic acid, or again from among the anhydrides of carboxylic acids, such as preferentially maleic anhydride, or chosen from among the monomers with ethylenic unsaturation and with a sulphonic function such as preferentially acrylamido-methyl-propane-sulphonic acid, sodium methallylsulphonate, vinyl sulphonic acid and styrene sulphonic acid, or again chosen from among the monomers with ethylenic unsaturation and with a phosphoric function such as preferentially vinyl phosphoric acid, ethylene glycol methacrylate phosphate, propylene glycol methacrylate phosphate, ethylene glycol acrylate phosphate, propylene glycol acrylate phosphate and their ethoxylates, or again chosen from among the monomers with ethylenic unsaturation and with a phosphonic function such as vinyl phosphonic acid, or blends of these monomers, b) of a least one monomer with a non-ionic ethylenic unsaturation of formula (I):

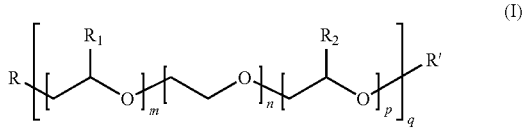

where:
- m and p represent a number of alkylene oxide groups of less than or equal to 150,
- n represents a number of ethylene oxide groups of less than or equal to 150,
- q represents a whole number at least equal to 1 and such that $5 \leq (m+n+p)q \leq 150$, and preferentially such that $15 \leq (m+n+p)q \leq 120$,
- $R_1$ represents hydrogen or the methyl or ethyl radical,
- $R_2$ represents hydrogen or the methyl or ethyl radical,
- R represents a radical containing an unsaturated polymerisable group, preferentially belonging to the group of vinylics, or to the group of acrylic, methacrylic, maleic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
- R' represents hydrogen or a hydrocarbonated radical having 1 to 40 carbon atoms, or an ionic or ionisable grouping such as a phosphate, a phosphonate, a sulphate, a sulphonate, a carboxylic, or indeed a primary, secondary or tertiary amine, or a quaternary ammonium, or indeed their blends, and preferentially represents a hydrocarbonated radical having 1 to 12 carbon atoms, and very preferentially a hydrocarbonated radical having 1 to 4 carbon atoms.

or a blend of several monomers of formula (I), c) possibly at least one monomer of the acrylamide or methacrylamide type, or their derivates such as N-[3-(dimethylamino)propyl]acrylamide or N-[3-(dimethylamino)propyl]methacrylamide, and their blends, or again of at least one non-water soluble monomer such as the alkyl acrylates or methacrylates, the unsaturated esters such as N-[2-(dimethylamino)ethyl]methacrylate, or N-[2-(dimethylamino)ethyl]acrylate, the vinylics such as vinyl acetate, vinylpyrrolidone, styrene, alphamethylstyrene and their derivates, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or again at least one organofluorate monomer, or again at least one organosililate monomer, or their blends, d) and possibly at least one crosslinking monomer preferentially chosen from the group constituted by ethylene glycol dimethacrylate, trimethylolpropanetriacrylate, allyl acrylate, the allyl maleates, methylene-bis-acrylamide, methylene-bis-methacrylamide, tetrallyloxyethane, the triallylcyanurates, the allyl ethers obtained from polyols such as pentaerythritol, sorbitol, sucrose or their blends.

The chlorinated thermoplastic material according to the invention is also characterised in that the comb polymer used as a compatibilising agent consists, expressed by weight:

a) between 2% and 95%, preferentially between 5% and 50%, very preferentially between 5% and 25% of at least one anionic monomer with ethylenic unsaturation and with a monocarboxylic function preferentially chosen from among acrylic or methacrylic acid, or again the diacid hemiesters such as the $C_1$ to $C_4$ monoesters of maleic or itaconic acids, or chosen from among the monomers with ethylenic unsaturation and with a dicarboxylic function and preferentially from among itaconic or maleic acid, or again from among the anhydrides of carboxylic acids, such as preferentially maleic anhydride, or chosen from among the monomers with ethylenic unsaturation and with a sulphonic function such as preferentially acrylamido-methyl-propane-sulphonic acid, sodium methallylsulphonate, vinyl sulphonic acid and styrene sulphonic acid, or again chosen from among the monomers with ethylenic unsaturation and with a phosphoric function such as preferentially vinyl phosphoric acid, ethylene glycol methacrylate phosphate, propylene glycol methacrylate phosphate, ethylene glycol acrylate phosphate, propylene glycol acrylate phosphate and their ethoxylates, or again chosen from among the monomers with ethylenic unsaturation and with a phosphonic function such as vinyl phosphonic acid, or blends of these monomers, b) between 2% and 95%, preferentially between 50% and 95%, and very preferentially between 70% and 95%, of at least one non-ionic monomer with ethylenic unsaturation, of formula (I):

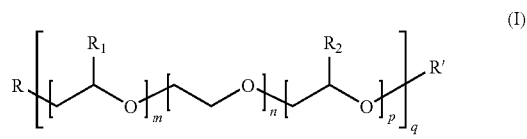

where:
- m and p represent a number of alkylene oxide groups of less than or equal to 150,
- n represents a number of ethylene oxide groups of less than or equal to 150,
- q represents a whole number at least equal to 1 and such that $5 \leq (m+n+p)q \leq 150$, and preferentially such that $15 \leq (m+n+p)q \leq 120$,
- $R_1$ represents hydrogen or the methyl or ethyl radical,
- $R_2$ represents hydrogen or the methyl or ethyl radical,
- R represents a radical containing an unsaturated polymerisable group, preferentially belonging to the group of vinylics, or to the group of acrylic, methacrylic, maleic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
- R' represents hydrogen or a hydrocarbonated radical having 1 to 40 carbon atoms, or an ionic or ionisable grouping such as a phosphate, a phosphonate, a sulphate, a sulphonate, a carboxylic, or indeed a primary, secondary or tertiary amine, or a quaternary ammonium, or indeed their blends, and preferentially represents a hydrocarbonated radical having 1 to 12 carbon atoms, and very preferentially a hydrocarbonated radical having 1 to 4 carbon atoms.

or a blend of several monomers of formula (I), c) between 0% and 50% of at least one monomer of the acrylamide or methacrylamide type, or their derivates such as N-[3-(dimethylamino)propyl]acrylamide or N-[3-(dimethylamino)propyl]methacrylamide, and their blends, or again of at least one non-water soluble monomer such as the alkyl acrylates or methacrylates, the unsaturated esters such as N-[2-(dimethylamino)ethyl]methacrylate, or N-[2-(dimethylamino)ethyl]acrylate, the vinylics such as vinyl acetate, vinylpyrrolidone, styrene, alphamethylstyrene and their derivates, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or again one organofluorate monomer, or again one organosililate monomer, or their blends, d) between 0% and 3% of at least one crosslinking monomer chosen preferentially from the group constituted by ethylene glycol dimethacrylate, trimethylolpropanetriacrylate, allyl acrylate, the allyl maleates, methylene-bis-acrylamide, methylene-bis-methacrylamide, tetrallyloxyethane, the triallylcyanurates, the allyl ethers obtained from polyols such as pentaerythritol, sorbitol, sucrose or their blends, where the total proportions of the constituents a), b), c) and d) are equal to 100%.

The polymer used according to the invention is obtained by processes of radical polymerisation in solution, in a direct or reverse emulsion, in suspension or precipitation in solvents, in the presence of catalytic systems and transfer agents, or again by processes of controlled radical polymerisation, and preferentially by nitroxide mediated polymerisation (NMP) or by cobaloximes, by atom transfer radical polymerisation (ATRP), by controlled radical polymerisation by sulphurated derivatives, chosen from among carbamates, dithioesters or trithiocarbonates (RAFT) or xanthates.

This polymer obtained in the acid form, and possibly distilled, may also be partially or totally neutralised by one or more neutralisation agents having a monovalent neutralising function or a polyvalent neutralising function such as, for example, for the monovalent function of those chosen from the group constituted by the alkaline cations, very preferentially sodium, potassium, lithium, ammonium or the primary, secondary or tertiary aliphatic and/or cyclic amines, such as, for example, stearylamine, the ethanolamines (mono-, di-, triethanolamine), mono- and diethylamine, cyclohexylamine, methylcyclohexylamine, amino methyl propanol, morpholine, or again, for the polyvalent function, those chosen from the group constituted by the alkaline earth divalent cations, very preferentially magnesium and calcium, or again zinc, and also by the trivalent cations, of which very preferentially aluminium, or again by certain cations of higher valency.

Each neutralisation agent then acts with neutralisation rates inherent to each valency function.

According to another variant, the polymer derived from the polymerisation reaction may also be, before or after the total or partial neutralisation reaction, treated and separated into several phases, according to static or dynamic processes known to the skilled man in the art, by one or more polar solvents belonging notably to the group constituted by water, methanol, ethanol, propanol, isopropanol, the butanols, acetone, tetrahydrofuran or their blends.

One of the phases then corresponds to the polymer used according to the invention.

According to another variant, the said polymer may also be dried.

The scope and interest of the invention will be better appreciated through the following examples, which are by no means limitative.

EXAMPLES

In all the examples, the molecular weight of the polymers used is determined according to the method explained below, by Steric Exclusion Chromatography (CES).

1 ml of the polymer solution is put on a capsule, and then evaporated at ambient temperature in a vane pump vacuum. The solute is recovered by 1 ml of the eluent of the CES, and the whole is then injected in the CES equipment. The CES eluent is an $NaHCO_3$ solution: 0.05 mole/l, $NaNO_3$: 0.1 mole/L, triethylamine 0.02 mole/L, $NaN_3$ 0.03% by mass. The CES chain contains an isocratic pump (Waters™ 515) the flow rate of which is regulated at 0.5 ml/min., a kiln containing a precolumn of the "Guard Column Ultrahydrogel Waters™" type, a linear column measuring 7.8 mm internal diameter and 30 cm length of the "Ultrahydrogel Waters™" type, and a refractometric detector of the RI Waters™ 410 type. The kiln is heated to a temperature of 60° C. and the refractometer to 50° C. The chromatogram's detection and processing application is the SECential application, supplied by "L.M.O.P.S. CNRS, Chemin du Canal, Vernaison, 69277". The CES is calibrated by a series of 5 sodium poly(acrylate) standards supplied by Polymer Standards Service™.

Example 1

This example illustrates the use of comb polymers according to the present invention, in a process of manufacture of chlorinated thermoplastic materials, intended for the manufacture of construction materials which are window profiles.

This example also illustrates the chlorinated thermoplastic materials obtained according to the present invention.

These chlorinated thermoplastic materials contain a PVC resin, calcium carbonate and a comb polymer. The calcium carbonate and the comb polymer were introduced in the form of dry powder resulting from a grinding stage in an aqueous medium of calcium carbonate in the presence of the said polymer, and drying of the obtained suspension in the presence of stearic acid (mode 1).

The reference is constituted by the same chlorinated thermoplastic composition in which the calcium carbonate has been ground with a grinding aid agent according to the prior art, and then dried in the presence of stearin, where the quantity of stearin used is greater than in the invention.

This example uses 16 parts by dry weight of calcium carbonate for 100 parts by dry weight of PVC resin.

Composition of the Chlorinated Thermoplastic Materials

For each of the tests n° 1 and 2, the chlorinated thermoplastic compositions manufactured use:
 a PVC resin sold by the company ARKEMA™ under the name Lacovyl™ S110P
 titanium dioxide sold by the company KRONOS™ under the name Kronos™ 2200
 a thermal stabiliser sold by the company BARLOCHER™ under the name One Pack Baeropan™
 a lubricant sold by the company LAPASSE ADDITIVES CHEMICALS™ under the name Lacowax™ EP
 an organic impact modifier additive of the core-skin type sold by the company ARKEMA™ under the name Durastrength™ 320 calcium carbonate in powder form, manufacture of which is described in greater detail below a comb polymer according to the invention or a grinding agent of prior art, the nature of which is described in greater detail below The quantities used have been indicated in table 1.

Obtaining Dry Powders of Calcium Carbonate

The aqueous suspensions of calcium carbonate obtained by grinding with grinding aid agents of prior art or a comb polymer according to the invention were dried in powder form using a drying fountain of the Niro Minor Mobile 2000 type sold by the company NIRO™.

The characteristics of this drying are:
gas inlet temperature: 350° C.
gas outlet temperature: 102-105° C.
ventilation 99% open
air pressure: 4 bars Manufacture of Dry PVC Blends For both tests n° 1 and 2, one commences by mixing the different constituents used in the composition of the chlorinated thermoplastic materials. Such blends are made according to the methods well known to the skilled man in the art.

Extrusion of Dry PVC Blends

All the dry blends were extruded with a Thermoelectron Polylab™ system fitted with a twin-screw and a sheet and plate die (25 mm×3 mm).

The PVC profiles are then calibrated at 15° C. in a water bath and laminated on a Yvroud system. The extrusion parameters are:
temperatures of the 4 zones: 170-180-185-190° C.
screw speed: 30 rpm Measurement of Impact Resistances The impact resistance measurements are made according to norm British Standard BS 7413: 2003. The measurements were averaged over batches of 10 test samples manufactured with the Diadisc™ 4200 machine sold by the company MUTRONIC™.

Brightness Measurement

The brightness measurements were made at 60°, using a Tri-Gloss spectrophotometer sold by the company BYK-GARDNER™.

Test No. 1

This test illustrates the prior art.

It uses an aqueous suspension of calcium carbonate, 78% by weight of the particles of which have a diameter of less than 1 µm, as measured by a device of the Sedigraph™ 5100 type sold by the company MICROMERITICS™, and obtained by grinding in a wet medium of the calcium carbonate with 0.7% by dry weight relative to the dry weight of carbonate of an acrylic homopolymer according to the prior art.

The said suspension was dried according to the method previously described, in the presence of 1.5% by dry weight of stearic acid relative to the dry weight of calcium carbonate.

Test No. 2

This test illustrates the invention.

It uses an aqueous suspension of calcium carbonate, 72% by weight of the particles of which have a diameter of less than 1 µm as measured by a device of the Sedigraph™ 5100 type sold by the company MICROMERITICS™, obtained by grinding calcium carbonate with 0.7% by dry weight relative to the dry weight of calcium carbonate, of a comb polymer of molecular weight 35,000 g/mole, obtained by a controlled radical polymerisation process in water of:

92% by weight of methoxy polyethylene glycol methacrylate of molecular weight 5,000 g/mole,
8% of acrylic acid,
and totally neutralised by soda.

The said suspension was dried according to the method previously described, in the presence of 0.45% by dry weight of stearic acid relative to the dry weight of calcium carbonate.

The composition of the formulations of tests 1 and 2, together with the impact-resistance and brightness values obtained, are given in table 1.

TABLE 1 composition of the different chlorinated thermoplastic formulations and corresponding brightness and impact-resistance values

| Test n° | 1 | 2 |
|---|---|---|
| Prior art/Invention (PA/IN) | PA | IN |
| Lacovyl ™ | 100 | 100 |
| Kronos ™ 2200 | 5 | 5 |
| One Pack Baeropan ™ | 2.5 | 2.5 |
| Lacowax ™ | 0.05 | 0.05 |
| Durastrength ™ | 6 | 6 |
| Calcium carbonate ground according to the prior art | 16 | 0 |
| Calcium carbonate ground according to the invention | 0 | 16 |
| Stearic acid* | 1.5 | 0.45 |
| Impact (kJ/m$^2$) | 20.4 | 70.4 |
| Brightness | 65.2 | 73.1 |

The %s of polymers are taken to be by dry weight of polymer relative to the dry weight of calcium carbonate % by dry weight of stearic acid relative to the dry weight of calcium carbonate.

The properties observed for test n° 1 in terms of the test for impact resistance are properties of the fragile type, whereas properties of the ductile type are observed for test n° 2.

The results of table 1 demonstrate that the impact resistance improved in the case of the invention, i.e. through the use of the polymer according to the invention which enables the quantity of stearic acid used to be reduced, the latter being divided by 2.

The results of table 1 also demonstrate that the brightness is improved in the case of the invention, i.e. through the use of the polymer according to the invention which enables the quantity of stearic acid used to be reduced.

These results are particularly surprising in that, since the granulometry of the calcium carbonate used in test 1 is finer than in test 2, the skilled man in the art would have expected to obtain a higher impact resistance and brightness in test 1 than in test 2. These results therefore demonstrate that the use of the polymer according to the invention enables the compatibility of the calcium carbonate with the PVC resin to be improved, whilst notably reducing the quantity of stearic acid used Example 2

This example illustrates the use of comb polymers according to the present invention, in a process of manufacture of chlorinated thermoplastic materials, intended for the manufacture of construction materials which are window profiles.

This example also illustrates the chlorinated thermoplastic materials obtained according to the present invention.

These chlorinated thermoplastic materials contain a PVC resin and calcium carbonate. The calcium carbonate and the comb polymer were introduced in the form of dry powder resulting:

from a stage of grinding in an aqueous medium of calcium carbonate in the presence of the said polymer, and drying of the suspension obtained, in the presence of stearic acid (mode 1), or from a stage of blending of the said polymer with the suspension of calcium carbonate previously ground with an acrylic polymer according to the prior art, and drying of the suspension obtained, without stearic acid (mode 3).

The reference is constituted by the same chlorinated thermoplastic composition in which the calcium carbonate has been ground with an acrylic polymer according to the prior art, and then dried in the presence of stearin, where the quantity of stearin used is greater than in all the tests illustrating the invention.

This example uses 8 parts by dry weight of calcium carbonate for 100 parts by dry weight of PVC resin.

For each of the tests n° 3 to 11, the chlorinated thermoplastic compositions manufactured use the same constituents as in example 1; the quantities used are given in table 2.

The dry powders of calcium carbonate were dried using the same protocol as that described in example 1.

The dry PVC blends are manufactured as in example 1, and then extruded according to example 1

Similarly, the impact resistances are determined as in example 1.

Test No. 3

This test illustrates the prior art.

It uses an aqueous suspension of calcium carbonate, 67% by weight of the particles of which have a diameter of less than 1 μm, as measured by a device of the Sedigraph™ 5100 type sold by the company MICROMERITICS™, and obtained by grinding in a wet medium of the calcium carbonate with 0.7% by dry weight relative to the dry weight of carbonate, of an acrylic homopolymer according to the prior art.

The said suspension was dried according to the method previously described, in the presence of 1.1% by dry weight of stearic acid relative to the dry weight of calcium carbonate.

Test No. 4

This test illustrates the invention.

It uses an aqueous suspension of calcium carbonate, 67% by weight of the particles of which have a diameter of less than 1 μm as measured by a device of the Sedigraph™ 5100 type sold by the company MICROMERITICS™, obtained by grinding calcium carbonate with 0.7% by dry weight relative to the dry weight of calcium carbonate, of a comb polymer of molecular weight 35,000 g/mole, obtained by a controlled radical polymerisation process in water of:
- 78% by weight of methoxy polyethylene glycol methacrylate of molecular weight 5,000 g/mole,
- 4% of acrylic acid,
- 18% methacrylic acid.

and totally neutralised by soda.

The said suspension was dried according to the method previously described, without stearic acid.

Test No. 5

This test illustrates the invention.

It uses an aqueous suspension of calcium carbonate, 67% by weight of the particles of which have a diameter of less than 1 μm as measured by a device of the Sedigraph™ 5100 type sold by the company MICROMERITICS™, obtained by grinding calcium carbonate with 0.7% by dry weight relative to the dry weight of calcium carbonate, of a comb polymer of molecular weight 35,000 g/mole, obtained by a controlled radical polymerisation process in water of:
- 92% by weight of methoxy polyethylene glycol methacrylate of molecular weight 5,000 g/mole,
- 8% of acrylic acid, and totally neutralised by soda.

The said suspension was dried according to the method previously described, without stearic acid.

Test No. 6

This test illustrates the invention.

It uses an aqueous suspension of calcium carbonate, 67% by weight of the particles of which have a diameter of less than 1 μm as measured by a device of the Sedigraph™ 5100 type sold by the company MICROMERITICS™, obtained by grinding calcium carbonate with 0.7% by dry weight relative to the dry weight of calcium carbonate, of a comb polymer of molecular weight 35,000 g/mole, obtained by a controlled radical polymerisation process in water of:
- 92% by weight of methoxy polyethylene glycol methacrylate of molecular weight 5,000 g/mole,
- 8% of acrylic acid, and totally neutralised by soda.

The said suspension was dried according to the method previously described, in the presence of 0.45% by dry weight of stearic acid relative to the dry weight of calcium carbonate.

Test No. 7

This test illustrates the invention.

It uses an aqueous suspension of calcium carbonate, 67% by weight of the particles of which have a diameter of less than 1 μm as measured by a device of the Sedigraph™ 5100 type sold by the company MICROMERITICS™, obtained by grinding calcium carbonate with 0.7% by dry weight relative to the dry weight of calcium carbonate, of a comb polymer of molecular weight 35,000 g/mole, obtained by a controlled radical polymerisation process in water of:
- 92% by weight of methoxy polyethylene glycol methacrylate of molecular weight 5,000 g/mole,
- 8% of acrylic acid, and totally neutralised by soda.

The said suspension was dried according to the method previously described, in the presence of 0.90% by dry weight of stearic acid relative to the dry weight of calcium carbonate.

Test No. 8

This test illustrates the invention.

It uses an aqueous suspension of calcium carbonate, 67% by weight of the particles of which have a diameter of less than 1 μm as measured by a device of the Sedigraph™ 5100 type sold by the company MICROMERITICS™, obtained by grinding calcium carbonate with 0.5% by dry weight relative to the dry weight of calcium carbonate, of a comb polymer of molecular weight 35,000 g/mole, obtained by a controlled radical polymerisation process in water of:
- 92% by weight of methoxy polyethylene glycol methacrylate of molecular weight 5,000 g/mole,
- 8% of acrylic acid, and totally neutralised by soda.

The said suspension was dried according to the method previously described, without stearic acid.

Test No. 9

This test illustrates the invention.

It uses an aqueous suspension of calcium carbonate, 67% by weight of the particles of which have a diameter of less than 1 μm as measured by a device of the Sedigraph™ 5100 type sold by the company MICROMERITICS™, obtained by grinding calcium carbonate with 0.5% by dry weight relative to the dry weight of calcium carbonate, of a comb polymer of molecular weight 35,000 g/mole, obtained by a controlled radical polymerisation process in water of:
- 92% by weight of methoxy polyethylene glycol methacrylate of molecular weight 5,000 g/mole,
- 8% of acrylic acid, and totally neutralised by soda.

The said suspension was dried according to the method previously described, in the presence of 0.45% by dry weight of stearic acid relative to the dry weight of calcium carbonate.

Test No. 10

This test illustrates the invention.

It uses an aqueous suspension of calcium carbonate, 67% by weight of the particles of which have a diameter of less than 1 μm as measured by a device of the Sedigraph™ 5100 type sold by the company MICROMERITICS™, obtained by grinding calcium carbonate with 0.7% by dry weight relative to the dry weight of calcium carbonate, of a homopolymer of acrylic acid, and then by blending in the suspension obtained of a comb polymer of molecular weight 42,400 g/mole, obtained by a controlled radical polymerisation process in water of:

71.5% by weight of methoxy polyethylene glycol methacrylate of molecular weight 5,000 g/mole, 2.9% butoxypolyoxypropylene hemimaleate containing 19 groups of oxypropylene 4.9% ethylene glycol methacrylate, 20.7% of ethylene glycol phosphate having 6 groups of ethylene oxide, and totally neutralised by soda.

The said suspension was dried according to the method previously described, without stearic acid.

Test No. 11

This test illustrates the invention.

It uses an aqueous suspension of calcium carbonate, 67% by weight of the particles of which have a diameter of less than 1 μm as measured by a device of the Sedigraph™ 5100 type sold by the company MICROMERITICS™, obtained by grinding calcium carbonate with 0.7% by dry weight relative to the dry weight of calcium carbonate, of a homopolymer of acrylic acid, and then by blending in the suspension obtained of a comb polymer of molecular weight 35,000 g/mole, obtained by a controlled radical polymerisation process in water of:

78% by weight of methoxy polyethylene glycol methacrylate of molecular weight 5,000 g/mole, 4% of acrylic acid, 18% methacrylic acid.

and totally neutralised by soda.

The said suspension was dried according to the method previously described, without stearic acid.

The composition of the formulations of tests 3 to 11, together with the impact resistance and brightness values obtained, are given in table 2.

TABLE 2 composition of the different chlorinated thermoplastic formulations and values of the corresponding impact resistances.

| | Test n° | | | | | | | | |
|---|---|---|---|---|---|---|---|---|---|
| | 3 | 4 | 5 | 6 | 7 | 8 | 9 | 10 | 11 |
| Prior art/Invention (PA/IN) | PA | IN | IN | IN | IN | IN | IN | IN | IN |
| Lacovyl ™ | 100 | 100 | 100 | 100 | 100 | 100 | 100 | 100 | 100 |
| Kronos ™ 2200 | 5 | 5 | 5 | 5 | 5 | 5 | 5 | 5 | 5 |
| One Pack Baeropan ™ | 2.5 | 2.5 | 2.5 | 2.5 | 2.5 | 2.5 | 2.5 | 2.5 | 2.5 |
| Lacowax ™ | 0.05 | 0.05 | 0.05 | 0.05 | 0.05 | 0.05 | 0.05 | 0.05 | 0.05 |
| Durastrength ™ | 6 | 6 | 6 | 6 | 6 | 6 | 6 | 6 | 6 |
| Calcium carbonate ground with 0.7% of polymer according to the prior art | 8 | 0 | 0 | 0 | 0 | 0 | 0 | 0 | 0 |
| Calcium carbonate ground with 0.7% of polymer according to the prior art | 0 | 8 | 8 | 8 | 8 | 0 | 0 | 0 | 0 |
| Calcium carbonate ground with 0.5% of polymer according to the prior art | 0 | 0 | 0 | 0 | 0 | 8 | 8 | 0 | 0 |
| Calcium carbonate ground with 0.7% of polymer according to the prior art followed by an addition of 0.7% of polymer according to the invention | 0 | 0 | 0 | 0 | 0 | 0 | 0 | 8 | 8 |
| Stearic acid* | 1.10 | 0 | 0 | 0.45 | 0.90 | 0 | 0.45 | 0 | 0 |
| Impact (kJ/m$^2$) | 20.0 | 25.3 | 24.6 | 23.2 | 25.0 | 22.5 | 25.8 | 24.4 | 25.0 |
| Brightness | 58 | 61.4 | 63.5 | 72.9 | 75.0 | 61.0 | 66.5 | 59.0 | 58.4 |

The % s of polymers are taken to be by dry weight of polymer relative to the dry weight of calcium carbonate
*% by dry weight of stearic acid relative to the dry weight of calcium carbonate.

All breakages are breakages of the fragile type.

The results of table 2 demonstrate that the use of the polymers according to the invention during the stage of grinding, in a quantity equivalent with the prior art, leads to better impact resistances and brightnesses than for the prior art (tests 4, 5, 6 and 7 compared to test 3), for lesser quantities of stearic acid than in the prior art. Tests 4 and 5 even demonstrate that the use of the polymers according to the invention, during the grinding stage, enables the treatment with stearic acid to be eliminated completely.

Table 2 also demonstrates that the use of the polymers according to the invention during the stage of grinding, in a lesser quantity than that used in the prior art, leads to higher impact resistances and brightnesses than for the prior art (tests 8 and 9 compared to test 3), for lesser quantities of stearic acid than in the prior art.

Finally, table 2 demonstrates that the use of the polymers according to the invention during a stage of blending with previously ground calcium carbonate with a polymer according to the prior art leads to higher impact resistances and brightnesses than for the prior art (tests 10 and 11 compared to test 3), whilst completely eliminating the treatment with stearic acid.

These results therefore demonstrate that the use of the polymer according to the invention enables the compatibility of the calcium carbonate with the PVC resin to be improved, whilst notably reducing the quantity of stearic acid used, or by totally eliminating the stearic acid.

Example 3

This example illustrates the use of comb polymers according to the present invention, in a process of manufacture of chlorinated thermoplastic materials, intended for the manufacture of construction materials which are window profiles.

This example also illustrates the chlorinated thermoplastic materials obtained according to the present invention.

These chlorinated thermoplastic materials contain a PVC resin, calcium carbonate and a comb polymer. The calcium carbonate and the comb polymer were introduced in the form of dry powder resulting from a stage of blending of the said polymer with the suspension of calcium carbonate previously ground with a grinding aid agent according to the prior art, and drying of the suspension obtained, possibly in the presence of stearic acid (mode 3).

The reference is constituted by the same chlorinated thermoplastic composition in which the calcium carbonate has been ground with the same grinding aid agent according to the prior art, and then dried in the presence of stearin, where the quantity of stearin used is greater than in all the tests illustrating the invention.

This example uses 8 parts by dry weight of calcium carbonate for 100 parts by dry weight of PVC resin.

The difference between this example and example 2 lies in the granulometry of the calcium carbonate used.

For each of the tests n° 12 to 15, the chlorinated thermoplastic compositions manufactured use the same constituents as in example 1; the quantities used are given in table 2.

The dry powders of calcium carbonate were dried using the same protocol as that described in example 1.

The dry PVC blends are manufactured as in example 1, and then extruded according to example 1

Similarly, the impact resistances are determined as in example 1.

Test No. 12

This test illustrates the prior art.

It uses an aqueous suspension of calcium carbonate, 78% by weight of the particles of which have a diameter of less than 1 µm, as measured by a device of the Sedigraph™ 5100 type sold by the company MICROMERITICS™, and obtained by grinding in a wet medium of the calcium carbonate with 0.7% by dry weight relative to the dry weight of carbonate, of an acrylic homopolymer according to the prior art.

The said suspension was dried according to the method previously described, in the presence of 1.1% by dry weight of stearic acid relative to the dry weight of calcium carbonate.

Test No. 13

This test illustrates the invention.

It uses an aqueous suspension of calcium carbonate, 78% by weight of the particles of which have a diameter of less than 1 µm as measured by a device of the Sedigraph™ 5100 type sold by the company MICROMERITICS™, obtained by grinding calcium carbonate with 0.7% by dry weight relative to the dry weight of calcium carbonate, of an acrylic homopolymer according to the prior art, and then by blending of a comb polymer of molecular weight 35,000 g/mole, obtained by a controlled radical polymerisation process in water of:

92% by weight of methoxy polyethylene glycol methacrylate of molecular weight 5,000 g/mole, 8% of acrylic acid, and totally neutralised by soda.

The said suspension was dried according to the method previously described, without stearic acid.

Test No. 14

This test illustrates the invention.

It uses an aqueous suspension of calcium carbonate, 78% by weight of the particles of which have a diameter of less than 1 µm as measured by a device of the Sedigraph™ 5100 type sold by the company MICROMERITICS™, obtained by grinding calcium carbonate with 0.7% by dry weight relative to the dry weight of calcium carbonate, of an acrylic homopolymer according to the prior art, and then by blending of a comb polymer of molecular weight 35,000 g/mole, obtained by a controlled radical polymerisation process in water of:

92% by weight of methoxy polyethylene glycol methacrylate of molecular weight 5,000 g/mole, 8% of acrylic acid, and totally neutralised by soda.

The said suspension was dried according to the method previously described, without in the presence of 0.45% by dry weight of stearic acid relative to the dry weight of calcium carbonate.

Test No. 15

This test illustrates the invention.

It uses an aqueous suspension of calcium carbonate, 78% by weight of the particles of which have a diameter of less than 1 µm as measured by a device of the Sedigraph™ 5100 type sold by the company MICROMERITICS™, obtained by grinding calcium carbonate with 0.7% by dry weight relative to the dry weight of calcium carbonate, of an acrylic homopolymer according to the prior art, and then by blending of a comb polymer of molecular weight 35,000 g/mole, obtained by a controlled radical polymerisation process in water of:

92% by weight of methoxy polyethylene glycol methacrylate of molecular weight 5,000 g/mole, 8% of acrylic acid, and totally neutralised by soda.

The said suspension was dried according to the method previously described, in the presence of 0.90% by dry weight of stearic acid relative to the dry weight of calcium carbonate.

The composition of the formulations of tests 12 to 15, together with the impact-resistance and brightness values obtained, are given in table 3.

TABLE 3 composition of the different chlorinated thermoplastic formulations and values of the corresponding impact resistances and brightnesses.

| Test n° | 12 | 13 | 14 | 15 |
|---|---|---|---|---|
| Prior art/Invention (PA/IN) | PA | IN | IN | IN |
| Lacovyl ™ | 100 | 100 | 100 | 100 |
| Kronos ™ 2200 | 5 | 5 | 5 | 5 |
| One Pack Baeropan ™ | 2.5 | 2.5 | 2.5 | 2.5 |
| Lacowax ™ | 0.05 | 0.05 | 0.05 | 0.05 |
| Durastrength ™ | 6 | 6 | 6 | 6 |
| Calcium carbonate ground with 0.7% of polymer according to the prior art | 8 | 0 | 0 | 0 |
| Calcium carbonate ground with 0.7% of polymer according to the prior art | 0 | 8 | 8 | 8 |
| Stearic acid* | 1.1 | 0 | 0.45 | 0.90 |
| Impact (kJ/m$^2$) | 21.5 | 22.3 | 22.6 | 21.9 |
| Brightness | 71.4 | 73.6 | 75.1 | 76.7 |

The % s of polymers are taken to be by dry weight of polymer relative to the dry weight of calcium carbonate
*% by dry weight of stearic acid relative to the dry weight of calcium carbonate.

All breakages are breakages of the fragile type.

The results of table 3 demonstrate that the use of the polymers according to the invention during the stage of grinding, in a quantity equivalent to the prior art, leads to improved impact resistances and brightnesses relative to the prior art (tests 13, 14 and 15 compared to test 12), for lesser quantities of stearic acid than in the prior art.

Test 13 even demonstrates that the use of the polymers according to the invention, during the grinding stage, enables the treatment with stearic acid to be eliminated completely.

These results therefore demonstrate that the use of the polymer according to the invention enables the compatibility of the calcium carbonate with the PVC resin to be improved, whilst notably reducing the quantity of stearic acid used, or by totally eliminating the stearic acid.

Example 4

This example illustrates the use of comb polymers according to the present invention, in a process of manufacture of chlorinated thermoplastic materials, intended for the manufacture of construction materials which are claddings for windows.

This example also illustrates the chlorinated thermoplastic materials according to the present invention.

These chlorinated thermoplastic materials contain a PVC resin, calcium carbonate and a comb polymer. The calcium carbonate and the comb polymer were introduced in the form of dry powder resulting from a stage of blending after grinding in an aqueous medium of the calcium carbonate, and drying of the obtained suspension, in the presence of stearic acid (mode 3).

The reference is constituted by the same chlorinated thermoplastic composition containing the calcium carbonate ground with the a grinding aid agent according to the prior art, and then dried in the presence of stearin, where the quantity of stearin used is greater than in all the tests illustrating the invention.

This example uses 20 parts by dry weight of calcium carbonate for 100 parts by dry weight of PVC resin.

The dry powders of calcium carbonate were dried using the same protocol as that described in example 1.

The dry PVC blends are manufactured as in example 1, and then extruded by means of a Haake™ extruder. The extrusion parameters are:

temperatures of the 4 zones: 170-180-185-190° C.
screw speed: 30 revolutions per minute.

The impact resistances are determined according to a test known as a "Gardner test", undertaken according to norm ASTM D4226.

For each of the tests n° 16 to 18, the manufactured chlorinated thermoplastic compositions use:
 a Georgia Gulf™1091 PVC resin,
 a Thermolite™ 176 thermal stabiliser sold by the company ARKEMA™,
 a Licolube™ polyethylene wax sold by the company CLARIANT™,
 an oxidised AC 629 A polyethylene wax sold by HONEYWELL",
 calcium stearate,
 a K120N processability agent sold by ROHM & HAAS™,
 a Paraloid™ impact modifier sold by ROHM & HAAS™,
 a R-960 titanium dioxide sold by DUPONT™,
 calcium carbonate in powder form, manufacture of which is described in greater detail below,
 a comb polymer according to the invention or an acrylic polymer according to the prior art, the nature of which is described in greater detail below.

The quantities used have been indicated in table 4.

Test No. 16

This test illustrates the prior art.

It uses an aqueous suspension of calcium carbonate, 65% by weight of the particles of which have a diameter of less than 1 μm, as measured by a device of the Sedigraph™ 5100 type sold by the company MICROMERITICS™, and obtained by grinding in a wet medium of the calcium carbonate with 0.4% by dry weight relative to the dry weight of carbonate, of an acrylic homopolymer according to the prior art.

The said suspension was dried according to the method previously described, in the presence of 1.25% by dry weight of stearic acid relative to the dry weight of calcium carbonate.

Test No. 17

This test illustrates the invention.

It uses an aqueous suspension of calcium carbonate, 65% by weight of the particles of which have a diameter of less than 1 μm as measured by a device of the Sedigraph™ 5100 type sold by the company MICROMERITICS™, obtained by grinding calcium carbonate with 0.4% by dry weight relative to the dry weight of calcium carbonate, of an acrylic polymer according to the prior art, and then by blending with 0.75% by dry weight relative to the dry weight of calcium carbonate of a comb polymer of molecular weight 35,000 g/mole, obtained by a controlled radical polymerisation process in water of:
 92% by weight of methoxy polyethylene glycol methacrylate of molecular weight 5,000 g/mole,
 8% of acrylic acid,
and totally neutralised by soda.

The said suspension was dried according to the method previously described, in the presence of 0.45% by dry weight of stearic acid relative to the dry weight of calcium carbonate.

Test No. 18

This test illustrates the invention.

It uses an aqueous suspension of calcium carbonate, 65% by weight of the particles of which have a diameter of less than 1 μm as measured by a device of the Sedigraph™ 5100 type sold by the company MICROMERITICS™, obtained by grinding calcium carbonate with 0.7% by dry weight relative to the dry weight of calcium carbonate, of an acrylic polymer according to the prior art, and then by blending with 0.85% by dry weight relative to the dry weight of calcium carbonate of a comb polymer of molecular weight 35,000 g/mole, obtained by a controlled radical polymerisation process in water of:
92% by weight of methoxy polyethylene glycol methacrylate of molecular weight 5,000 g/mole,
8% of acrylic acid,
and totally neutralised by soda.

The said suspension was dried according to the method previously described, in the presence of 0.45% by dry weight of stearic acid relative to the dry weight of calcium carbonate.

The composition of the formulations of tests 16 to 18, together with the impact-resistance values obtained measured at −10° C., 0° C. and 23° C., are given in table 4.

TABLE 4 composition of the different chlorinated thermoplastic formulations and values of the corresponding impact resistances.

| Test n° | 16 | 17 | 18 |
|---|---|---|---|
| Prior art/Invention (PA/IN) | PA | IN | IN |
| PVC resin | 100 | 100 | 100 |
| Thermolite ™ | 1 | 1 | 1 |
| Calcium stearate | 1.5 | 1.5 | 1.5 |
| Licolube ™ | 0.8 | 0.8 | 0.8 |
| AC 629 A | 0.1 | 0.1 | 0.1 |
| K 120 N | 1 | 1 | 1 |
| Paraloid ™ | 4 | 4 | 4 |
| R-960 TiO2 | 1 | 1 | 1 |
| Calcium carbonate ground with 0.7% of polymer according to the prior art | 20 | 0 | 0 |
| Calcium carbonate ground with 0.7% of polymer according to the prior art and then blended with 0.75% of polymer according to the invention | 0 | 20 | 0 |
| Calcium carbonate ground with 0.7% of polymer according to the prior art and then blended with 0.85% of polymer according to the invention | 0 | 0 | 20 |
| Stearic acid* | 1.25 | 0.45 | 0.45 |
| Impact (J) at 23° C. | 12.6 | 15.0 | 14.7 |
| Impact (J) at 0° C. | 8.6 | 10.6 | 11.2 |
| Impact (J) at −10° C. | 7.6 | 8.2 | 8.7 |

The % s of polymers are taken to be by dry weight of polymer relative to the dry weight of calcium carbonate
% by dry weight of stearic acid relative to the dry weight of calcium carbonate.

These results clearly demonstrate that the use of the polymers according to the invention leads to improved impact resistances, compared to the use of a polymer according to the prior art with a quantity of stearic acid greater than that used in the case of the invention, at 3 different temperatures.

The invention claimed is:

1. A method of manufacturing a chlorinated thermoplastic material comprising at least one mineral filler, which functions as a compatibilizing agent, in at least one polymer which is a comb polymer containing at least one polyalkylene oxide group grafted onto at least one anionic monomer having ethylenic unsaturation.

2. The method according to claim 1, wherein said comb polymer is used during the process of manufacture of a chlorinated thermoplastic material, depending on the method:
in the form of dry powder, resulting from the stages of:
grinding and/or dispersing a mineral filler in an aqueous medium in the presence of said polymer, and optionally in the presence of at least one other grinding agent in an aqueous medium and/or at least one other dispersant,
drying of the dispersion and/or of the aqueous suspension of mineral matter obtained, with optional introduction of the said polymer, and optional treatment followed by classification of the powder obtained
and/or in the form of dry powder, resulting from the stages of:
dry grinding of the mineral filler in the presence of the said polymer, optionally in the presence of at least one other dry grinding agent, and
optional treatment and classification of the powder obtained,
and/or in the form of dry powder, resulting from the stages of:
introducing said polymer into a dispersion and/or into an aqueous suspension containing the mineral filler,
drying of the dispersion and/or of the aqueous suspension of mineral matter obtained, with optional introduction of the said polymer, and optional treatment followed by classification of the powder obtained,
and/or in the form of dry powder, resulting from the stages of:
drying of a dispersion and/or into an aqueous suspension containing the mineral filler in the presence of said polymer,
optional treatment and classification of the powder obtained,
and/or in the form of a dry powder, resulting from the stages of drying of a solution and/or of an emulsion containing said polymer and at least one other compound selected from among a thermal stabilizer, a UV stabilizer, a lubricant, a rheology modifier, an impact modifier and/or a processability agent; and/or
in the form of dry powder mixed with a chlorinated thermoplastic resin and a mineral filler.

3. The method according to claim 1, wherein the chlorinated thermoplastic resin is selected from the group consisting of PVC, post-chlorinated polyvinyl chloride (PVCC), chlorinated polyethylene, the copolymers of the PVC-vinyl polyacetate type (PVC-PVAC), and their blends.

4. The method according to claim 1, wherein said chlorinated thermoplastic material is intended for the manufacture of tubes, for the manufacture of external and/or internal construction materials or for the manufacture of industrial parts.

5. The method according to claim 1, wherein the mineral filler is selected from the group consisting of natural or synthetic calcium carbonate, the dolomites, kaolin, talc, gypsum, titanium dioxide, satin whit; aluminum trihydroxide, mica, carbon black, blends of more than one of these fillers together, blends of calcium carbonate with aluminium trihydroxide, blends with synthetic or natural fibres, or mineral co-structures.

6. The method according to claim 1, wherein said process comprises:
from 0.1 and 99% by dry weight of at least one chlorinated thermoplastic resin, compared to the total weight of the chlorinated thermoplastic formulation,
from 0.1 and 90% by dry weight, of at least one mineral filler, compared to the total weight of the chlorinated thermoplastic formulation,
from 0.01 and 5%, by dry weight, of a comb polymer consisting of at least one anionic monomer with ethylenic unsaturation on to which is grafted at least one polyalkylene oxide group, compared to the dry weight of mineral filler,
from 0 and 20%, by dry weight, of a thermal stabilizer, a UV stabilizer, a lubricant, a rheology modifier, an impact modifier and/or a processability agent, compared to the total weight of the chlorinated thermoplastic formulation,
from 0 and 3%, by dry weight, relative to the dry weight of mineral filler, of a compatibility agent other than said comb polymer, where said other compatibility agent is at least one fatty acid having 8 to 20 carbon atoms.

7. The method according to claim 1, said comb polymer contains at least one monomer of formula (I):

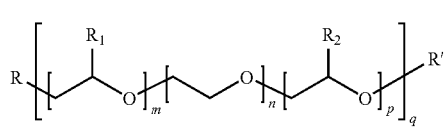

where m and p represent a number of alkylene oxide groups of less than or equal to 150,
n represents a number of ethylene oxide groups of less than or equal to 150,
q represents an integer at least equal to 1 and such that $5 \leq (m+n+p)q \leq 150$,
$R_1$ represents hydrogen, methyl or ethyl,
$R_2$ represents hydrogen, methyl or ethyl,
R represents a radical containing an unsaturated polymerisable group,
R' represents hydrogen or a hydrocarbonated radical having 1 to 40 carbon atoms, or an ionic or ionizable group.

8. The method according to claim 1, said comb polymer consists of:
at least one anionic monomer with ethylenic unsaturation and with a monocarboxylic or dicarboxylic or phosphoric or phosphonic or sulphonic group, or their blends,
at least one non-ionic monomer, where the non-ionic monomer consists of at least one monomer of formula (I):

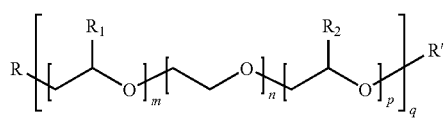

where m and p represent a number of alkylene oxide groups of less than or equal to 150,
n represents a number of ethylene oxide groups of less than or equal to 150,
q represents an integer at least equal to 1 and such that $5 \leq (m+n+p)q \leq 150$,
$R_1$ represents hydrogen, methyl or ethyl,
$R_2$ represents hydrogen, methyl or ethyl,
R represents a radical containing an unsaturated polymerisable group,
R' represents hydrogen or a hydrocarbonated radical having 1 to 40 carbon atoms, or an ionic or ionizable group.
or a blend of several monomers of formula (I),
optionally at least one monomer of the acrylamide or methacrylamide type, or their derivates and their blends, at least one non-water soluble monomer such as the alkyl acrylates or methacrylates, unsaturated esters, the vinylics such as vinyl acetate, vinylpyrrolidone, styrene, alphamethylstyrene and their derivates, or at least one cationic monomer or quaternary ammonium, at least one organofluorate or organosililate monomer, or a blend of several of these monomers,
optionally at least one monomer having at least two ethylenic unsaturations.

9. The method according to claim 1, said polymer is obtained by processes of radical polymerisation in solution, in a direct or reverse emulsion, in suspension or precipitation in solvents, in the presence of catalytic systems and transfer agents, or by processes of controlled radical polymerisation, atom transfer radical polymerisation (ATRP), controlled radical polymerisation by sulphurated derivatives, selected from the group consisting of carbamates, dithioesters or trithiocarbonates (RAFT) or xanthates.

10. The method according to claim 1, wherein said polymer obtained in the acid form, is partially or totally neutralised by one or more neutralisation agents having a monovalent neutralising function or a polyvalent neutralising function.

11. The method according to claim 1, said polymer derived from the polymerisation reaction is, before or after the total or partial neutralisation reaction, treated and separated into several phases, according to static or dynamic processes, by one or more polar solvents.

12. A chlorinated thermoplastic material containing:
at least one chlorinated thermoplastic resin,
at least one mineral filler,
at least one compatibility agent which consists of at least one comb polymer, containing at least one polyalkylene oxide group grafted onto at least one anionic monomer with ethylenic unsaturation,
at least one other compound selected from the group consisting of a thermal stabilizer, a UV stabilizer, a lubricant, a rheology modifier, an impact modifier and/or a processability agent,
at least one other compatibility agent other than the said comb polymer, this other compatibility agent consisting of at least one fatty acid having 8 to 20 carbon atoms.

13. The chlorinated thermoplastic material according to claim 12, the chlorinated thermoplastic resin is selected from the group consisting of PVC, post-chlorinated polyvinyl chloride (PVCC), chlorinated polyethylene, the copolymers of the PVC-vinyl polyacetate type (PVC-PVAC), and their blends.

14. The chlorinated thermoplastic material according to claim 12, wherein said chlorinated thermoplastic material is shaped into tubes, sheaths for the passage of cables, external and/or internal construction materials or industrial parts.

15. The chlorinated thermoplastic material according to claim 12, wherein the mineral filler is selected from the group consisting of natural or synthetic calcium carbonate, the dolomites, limestone, kaolin, talc, gypsum, titanium dioxide, satin white, aluminum trihydroxide, mica, carbon black, blends of more than one of these fillers together, blends of calcium carbonate with aluminium trihydroxide, blends with synthetic or natural fibres, mineral co-structures.

16. A chlorinated thermoplastic material according to claim 12, said chlorinated thermoplastic material comprises:
from 0.1 and 99% by dry weight of at least one chlorinated thermoplastic resin, compared to the total weight of the thermoplastic formulation,
from 0.1 and 90% by dry weight of at least one mineral filler, compared to the total weight of the chlorinated thermoplastic formulation,
from 0.01 and 5%, by dry weight, of a comb polymer consisting of at least one monomer with ethylenic unsaturation onto which is grafted at least one polyalkylene oxide group, compared to the dry weight of mineral filler,
from 0 and 20%, by dry weight, of a thermal stabilizer, a UV stabilizer, and/or a lubricant, a rheology modifier, an impact modifier and/or a processability agent, compared to the total weight of the chlorinated thermoplastic formulation;
from 0 and 3%, by dry weight, relative to the dry weight of mineral filler, of a compatibility agent other than said comb polymer, where this compatibility agent is constituted by at least one fatty acid having 8 to 20 carbon atoms.

17. A chlorinated thermoplastic material according to claim 12, the comb polymer, as a compatibilising agent, contains at least one monomer of formula (I):

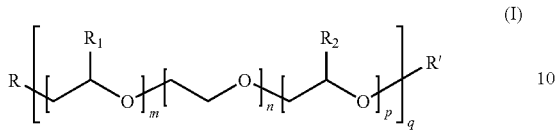

where m and p represent a number of alkylene oxide groups of less than or equal to 150, n represents a number of ethylene oxide groups of less than or equal to 150, q represents an integer at least equal to 1 and such that $5 \leq (m+n+p)q \leq 150$, $R_1$ represents hydrogen, methyl or ethyl, $R_2$ represents hydrogen, methyl or ethyl radical, R represents a radical containing an unsaturated polymerisable group R' represents hydrogen or a hydrocarbonated radical having 1 to 40 carbon atoms, or an ionic or ionizable group.

18. A chlorinated thermoplastic material according to claim 12, wherein the comb polymer, as a compatibilising agent, consists of:

at least one anionic monomer with ethylenic unsaturation and with a monocarboxylic or dicarboxylic or phosphoric or phosphonic or sulphonic group, or their blends, at least one non-ionic monomer, where the non-ionic monomer consists of at least one monomer of formula (I):

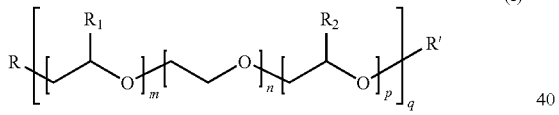

where m and p each represent a number of alkylene oxide groups of less than or equal to 150, n represents a number of ethylene oxide groups of less than or equal to 150, q represents an integer at least equal to 1 and such that $5 \leq (m+n+p)q \leq 150$, and preferentially such that $15 \leq (m+n+p)q \leq 120$ $R_1$ represents hydrogen, methyl or ethyl, $R_2$ represents hydrogen, methyl or ethyl, R represents a radical containing an unsaturated polymerisable group, R' represents hydrogen or a hydrocarbonated radical having 1 to 40 carbon atoms, or an ionic ionizable group.

or a blend of several monomers of formula (I), optionally at least one monomer of the acrylamide or methacrylamide type, or derivates thereof, at least one non-water soluble monomer such as the alkyl acrylates or methacrylates, unsaturated esters, vinylic compounds, or at least one cationic monomer or quaternary ammonium salt or their blends, and optionally at least one cross-linking monomer.

19. The chlorinated thermoplastic material according to claim 12, wherein said polymer is obtained by processes of radical polymerisation in solution, in a direct or reverse emulsion, in suspension or precipitation in solvents, in the presence of catalytic systems and transfer agents, by processes of controlled radical polymerisation, atom transfer radical polymerisation (ATRP), or by controlled radical polymerisation by sulphurated derivatives.

20. A chlorinated thermoplastic material according to claim 12, wherein the said polymer obtained in the acid form is partially or totally neutralised by one or more neutralisation agents having a monovalent neutralising function or a polyvalent neutralising function.

\* \* \* \* \*